United States Patent [19]
Hagerty

[11] Patent Number: 5,452,262
[45] Date of Patent: Sep. 19, 1995

[54] RADIO TELEMETRY BUOY FOR LONG-RANGE COMMUNICATION

[75] Inventor: James D. Hagerty, Tiverton, R.I.

[73] Assignee: The United States of America as represented by the Secretary of the Navy, Washington, D.C.

[21] Appl. No.: 322,656

[22] Filed: Oct. 11, 1994

[51] Int. Cl.6 .............................................. H04B 1/59
[52] U.S. Cl. .......................................... 367/6; 367/134
[58] Field of Search ........................ 367/2, 3, 6, 134; 441/11; 455/7

[56] References Cited

U.S. PATENT DOCUMENTS

| | | | |
|---|---|---|---|
| 4,097,837 | 6/1978 | Cyr | 367/6 |
| 4,763,126 | 8/1988 | Jawetz | 367/3 |

*Primary Examiner*—Daniel T. Pihulic
*Attorney, Agent, or Firm*—Michael J. McGowan; James M. Kasischke; Prithvi C. Lall

[57] ABSTRACT

A remotely controlled radio telemetry buoy serves as a communication link between an underwater acoustic interrogation/receiving transponder system and a remotely located surface platform. The buoy houses a transmission device, a transceiver device and a controller. The transmission device transmits data received from the transponder system as electromagnetic energy in a frequency range of 162-173 MHz. The transceiver device exchanges digital control signals between the surface platform and the buoy in the frequency range of 2-16 MHz. The controller transfers the control signals between the transceiver device and the transmission device and the transponder system.

16 Claims, 3 Drawing Sheets

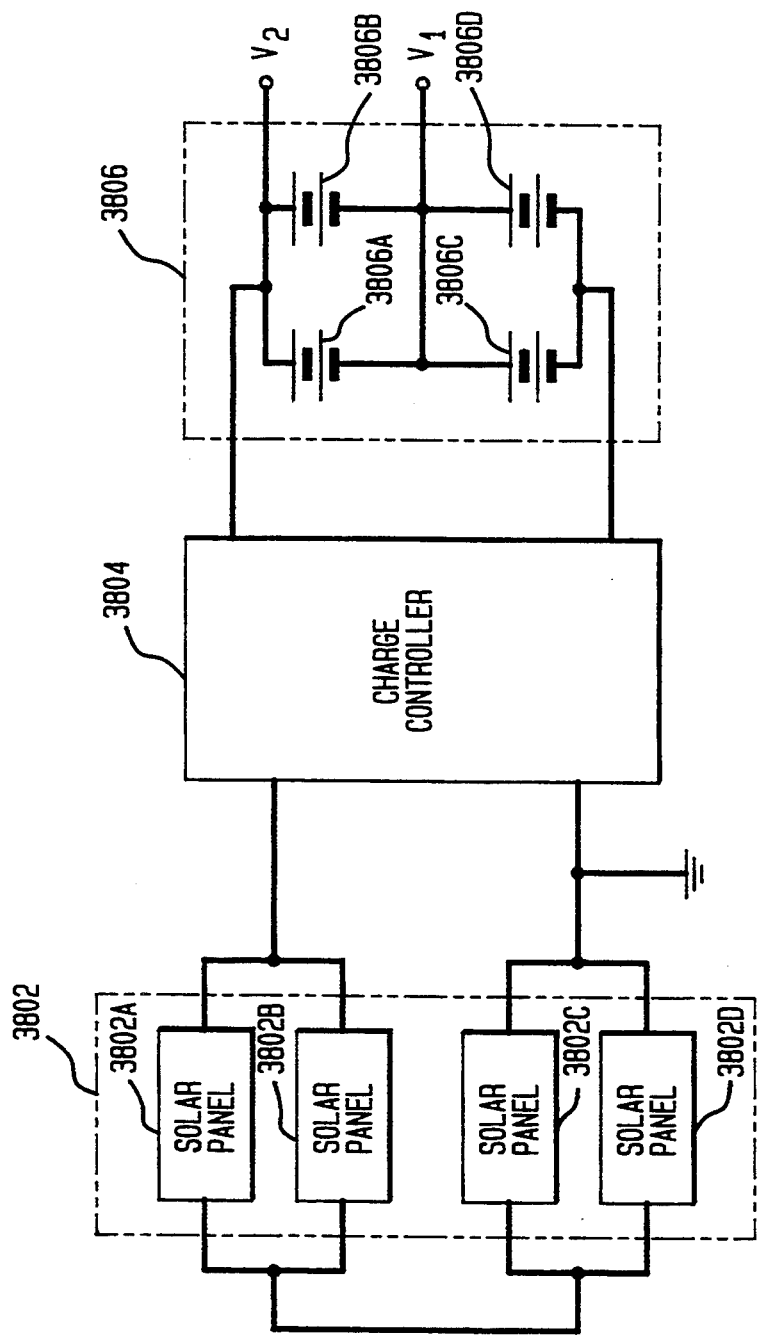

RADIO TELEMETRY BUOY FOR LONG-RANGE COMMUNICATION

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The present invention relates generally to marine communication, and more particularly to marine communication utilizing a remotely controlled radio telemetry buoy capable of serving as a long-range communication link between an underwater acoustic interrogation/receiving transponder system and a remotely located surface platform.

2. Description of the Prior Art

It is known in the art to deploy portable sonobuoys for temporary in-water tracking. Typically, a hydrophone is mounted below the buoy and receives acoustic tracking signals. After pre-amplification, the composite in-water signal is used to ultimately modulate a very small (0.5-1 watt) FM transmitter. The telemetry signal is relayed back to shore or to an aircraft or ship. Because the buoy antenna height is commonly only a few feet, transmission from the buoy does not extend over the horizon and is thus limited to line-of-sight, or typically 8–10 miles at VHF operating frequencies between 30 and 300 MHz.

Remote control systems for such buoys have historically been implemented using a standard U.S. Navy control frequency. At this frequency, an AM carrier with a primitive tone modulation scheme has been used. However, this modulation scheme and its decoder are severely limited in that only a few, i.e., typically three, independent commands are possible.

Another modulation scheme uses a DTMF (dual tone, multiple frequency) encoder to modulate an AM transmitter at UHF. This allows the use of inexpensive "touch tone" telephone technology. Thus, using a keypad encoder and decoder circuit board, sixteen unique decoded outputs can be obtained by pressing only one keypad button per command. Combinations of two and three keypad digits may be used to further expand the command set, with increased complexity at the decoder end.

However, both modulation schemes have propagation limitations owing to the UHF control frequency which is only useful at line-of-sight ranges unless transmit power of 50–100 watts and impractical shipboard antenna heights (75–100 feet) are used. Moreover, even if these conditions are met, control ranges of greater than 12–15 miles are not consistent and reliable.

UHF operating frequency radio modems can be used for remote control of the buoy, but in general these are manufactured for the 400–500 MHz frequency range and the power is limited to only a few watts. These frequencies are also limited to line-of-sight and propagation is quite sensitive to small objects such as passing boats.

The above noted deficiencies in the art of sonobuoy telemetry and control are increasingly important in view of the U.S. Navy's development of the Portable Tracking System (PTS). The base component of the PTS is an underwater acoustic transponder system. The transponder system includes a plurality of bottom deployed transponders that are acoustically interrogated by a pinger. In an effort to improve precision with respect to transponder interrogation and range tracking, each transponder communicates via phase coded, digital control/data words. Furthermore, it is desired to increase PTS telemetry uplink and control range beyond the current state-of-the-art line-of-sight distance limitation.

SUMMARY OF THE INVENTION

Accordingly, it is an object of the present invention to provide a radio telemetry method and system utilizing a remotely controlled telemetry buoy as a communication link between an underwater transponder system and a remotely located surface platform.

Another object of the present invention is to provide a remotely controlled telemetry buoy capable of communication over distances that exceed line-of-sight.

A further object of the present invention is to provide a remotely controlled telemetry buoy capable of serving as a telemetry uplink for the Navy's recently developed underwater acoustic interrogation/receiving transponder system.

Still another object of the present invention is to provide a remotely controlled telemetry buoy capable of relaying control signals to a plurality of sea bottom deployed transponders.

A still further object of the present invention is to provide a telemetry buoy powered for long-term deployment.

Other objects and advantages of the present invention will become more obvious hereinafter in the specification and drawings.

In accordance with the present invention, a remotely controlled radio telemetry buoy serves as a communication link between an underwater acoustic interrogation/receiving transponder system and a remotely located surface platform. The buoy houses a transmission device that is operably coupled to the transponder system. The transmission device transmits data received from the transponder system as electromagnetic energy in a frequency range of 162–173 MHz. The buoy also houses a transceiver device operating in a frequency range of 2–16 MHz. The transceiver device exchanges digital control signals between the surface platform and the buoy. A microprocessor-based controller is operably coupled to the transceiver device for transferring the control signals between the transceiver device and the transponder system as well as to other components in the buoy. A solar power supply is also housed by the buoy for powering the transmission device, the transceiver device, the transponder system and the controller.

BRIEF DESCRIPTION OF THE DRAWING(S)

Other objects, features and advantages of the present invention will become apparent upon reference to the following description of the preferred embodiments and to the drawings, wherein:

FIG. 3 is a schematic diagram of the solar power system configuration used in an embodiment of the present invention.

DESCRIPTION OF THE PREFERRED EMBODIMENT(S)

Figure 1:
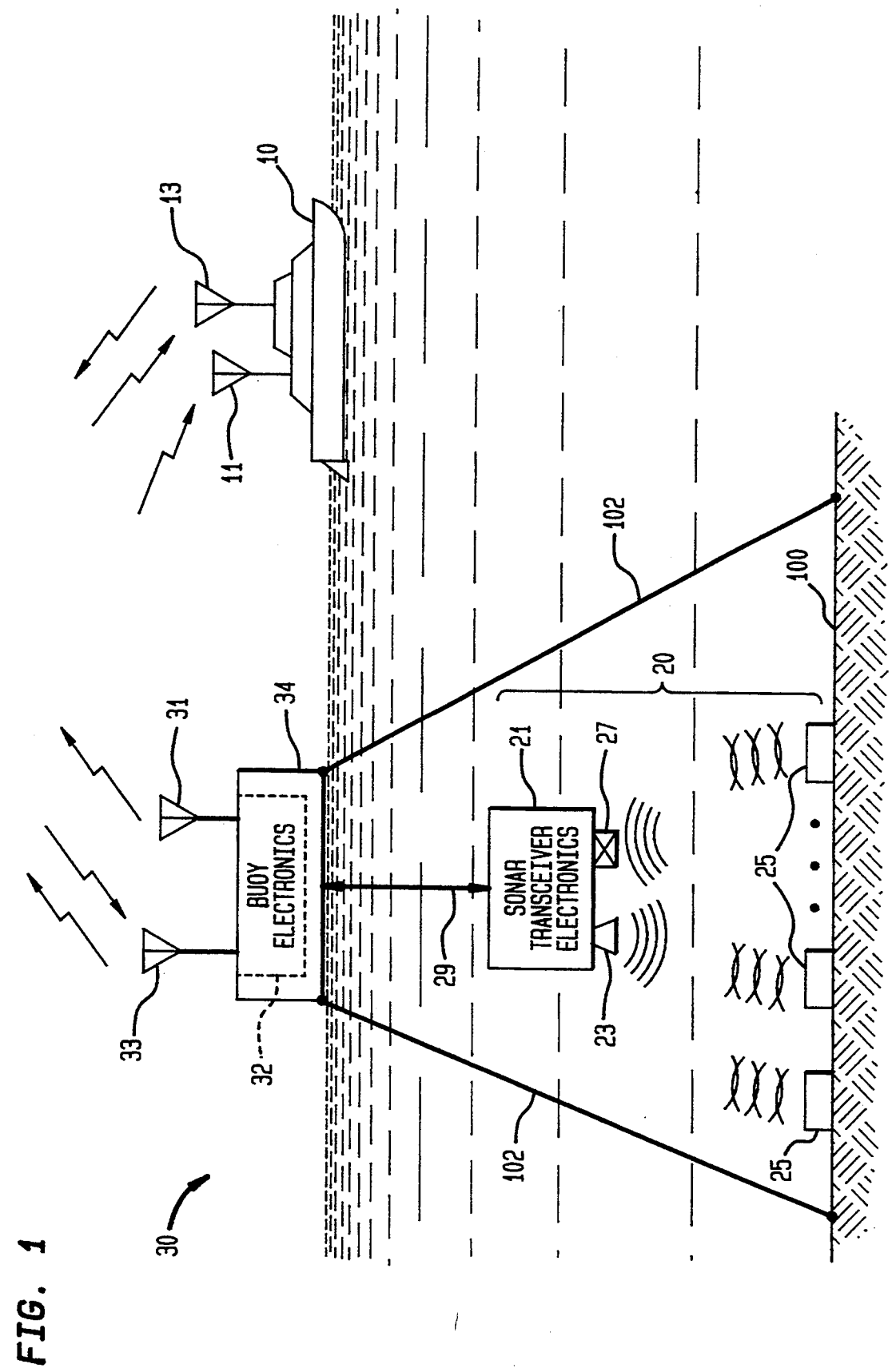
FIG. 1 is a diagram illustrating telemetry uplink and control data transfer between a surface platform and an underwater acoustic interrogation/receiving transponder system via a radio telemetry buoy in accordance with present invention.

Referring now to the drawings, and more particularly to FIG. 1, a diagram is shown illustrating both telemetry uplink and control data transfer between a surface platform, e.g., ship 10, and fixed-position, underwater acoustic interrogation/receiving transponder system 20. Linking ship 10 and transponder system 20 is radio telemetry buoy 30 which is moored to sea floor 100 by, for example, cables 102. In this way, telemetry buoy 30 floats at the sea surface in a relatively fixed relationship with respect to fixed-position, transponder system 20.

For purpose of the illustrated embodiment, is assumed that transponder system 20 is the U.S. Navy's Portable Tracking System (PTS). The operational elements of transponder system 20 include digitally-controlled, sonar transceiver electronics 21 which, when instructed by means of 16-bit control words, radiates coded "pings" into the water via acoustic projector 23. The pings serve as control and interrogation signals for a fixed transponder field defined by a plurality of bottom-mounted transponders 25. Once interrogated, transponders 25 respond acoustically. The responses are detected by hydrophone 27. Sonar transceiver electronics 21 amplifies the responses from transponders 25 and relays them to telemetry buoy 30 by means of signal cable 29. The responses passing to telemetry buoy 30 are analog in form.

In its broad operational aspect, telemetry buoy 30 transmits data received from transponder system 20 over the airwaves via transmission antenna 31. Such data transmissions are received at ship 10 via receiving antenna 11. Simultaneously, telemetry buoy 30 carries on bi-directional communication with ship 10 via transceiving antenna 33. The transceiving operation at ship 10 is represented by transceiving antenna 13. The ship-to-buoy portion of the bi-directional communication primarily serves as a means of remote control of both telemetry buoy 30 and transponder system 20. The buoy-to-ship portion of the bi-directional communication primarily serves as a means of buoy status reporting. The one-directional transmission and bi-directional transceiving operations are controlled by buoy electronics 32 maintained in buoy housing 34.

Figure 2:
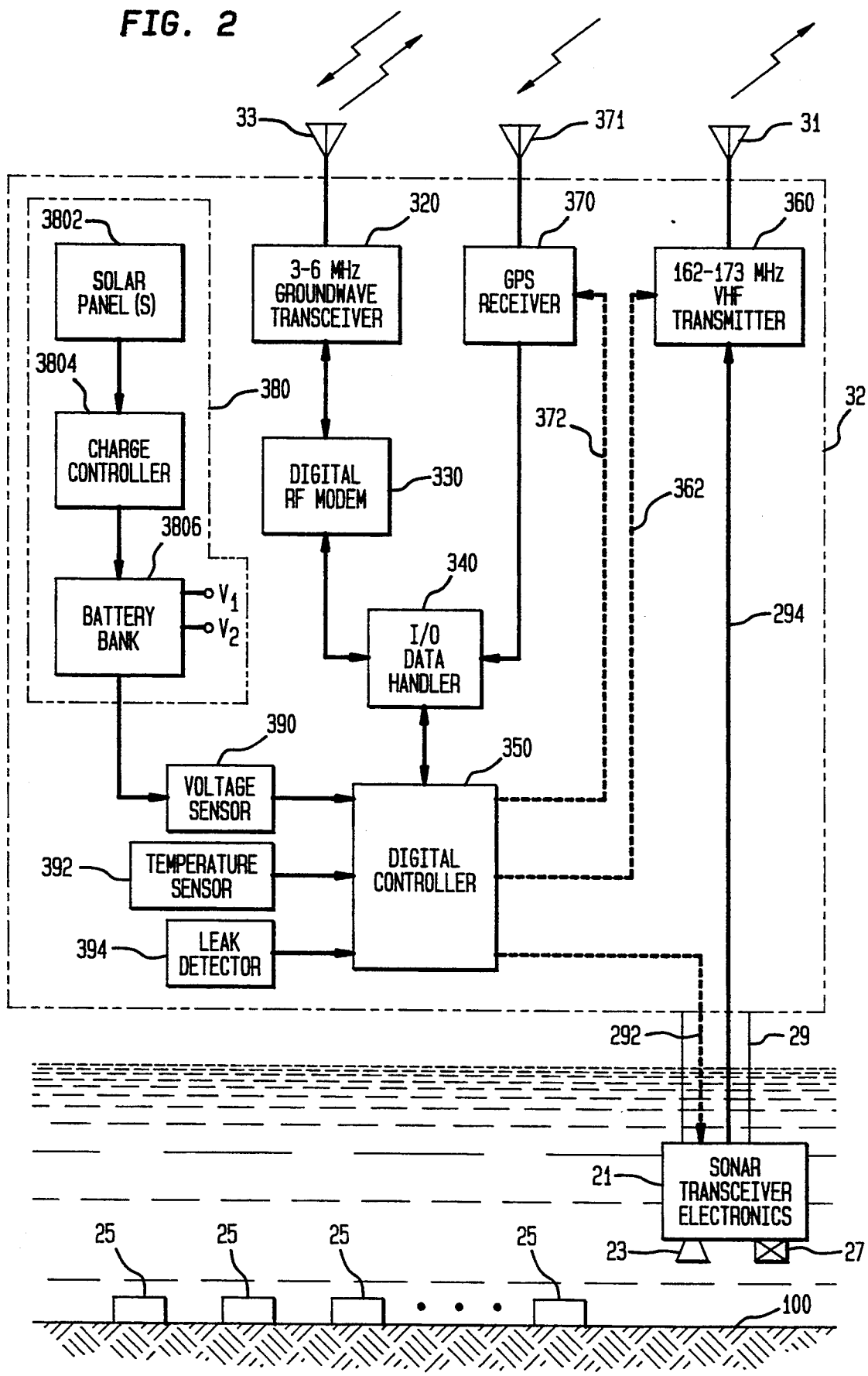
FIG. 2 is a block diagram of the equipment maintained onboard the radio telemetry buoy.

The unique features of the present invention will now be described with the aid of FIG. 2 which illustrates a block diagram of the equipment maintained onboard telemetry buoy 30. Like reference numerals designate corresponding elements between FIGS. 1 and 2. With respect to the bi-directional transceiving operation, buoy electronics 32 utilize transceiver 320 operating in the low end of the high frequency spectrum, e.g., in the frequency range of 2–16 MHz. In this frequency range, control data can be transferred by means of groundwave propagation up to distances of 100 miles. Skywave communication (using ionospheric reflection) is possible over several thousand miles. However, multipath distortion in this mode may cause bit errors in a digital communication system. The transceiver used in the buoy of the present invention possesses error-correction hardware that optimizes the probability of detection under multipath conditions. Thus, the 2–16 MHz propagation provides the reliable control range required for the 16-bit data communications required for precision control of buoy electronics 32.

In order to provide an advanced degree of precision and flexibility in terms of the (16-bit) control data, RF modem 330 demodulates the incoming control data into a digital bit stream for use by other elements of buoy electronics 32 as well as transponder system 20. By way of example, transceiver 320 and modem 330 can be implemented with a model AN/PRC-138 radio manufactured by Harris Corporation.

The digitized incoming control data is passed to digital controller 350 via input/output (I/O) data switch 340, e.g., a universal asynchronous receiver transmitter (UART). Since the digitized control data is typically in serial form for the sake of electronics simplicity and cost, controller 350 can be selected from a variety of micro-controllers having serial communication ports such as the 8051 microprocessor.

Digital controller 350 interprets the control data as being for control of buoy electronics 32 or transponder system 20. In terms of control of transponder system 20, controller 350 issues the digital control data on signal line 292 which is part of signal cable 29. Control of transponder system 20 can take the form of activation/deactivation, configuration or calibration signals. In terms of control of buoy electronics 32, digital controller 350 interprets and routes the control data to the appropriate element maintained in buoy electronics 32. Examples of such control will be explained further below.

When instructed by the control data passed on signal line 292, transponder system 20 relays back acoustic tracking data recovered by hydrophone 27. This data is then amplified and used as a modulation signal on line 294 to modulate transmitter 360. Transmitter 360 is an FM transmitter having an output carrier in the 162–173 MHz frequency range to provide continuous wideband FM transmission. By way of example, transmitter 360 is a model 110-8794 OXX manufactured by Spartan Electronics.

The use of a wideband FM frequency range provides for good analog data telemetry because the deviation bandwidth associated with this frequency range is proportional to the modulating amplitude and thus the dynamic range of the modulating signals. The wideband frequency range of 162–173 MHz utilized by the present invention is particularly advantageous for the present invention because: i) it represents the upper region allocated for Navy VHF telemetry transmission, ii) it provides a good deal of spectral separation with respect to the 2–16 MHz remote control data link frequency range utilized by telemetry buoy 30, and iii) it has an allowable deviation bandwidth of 75 kHz. While another government telemetry band exists at 43 MHz, telemetry at 43 MHz has a lower allowable FM deviation bandwidth and provides far less spectral separation from the 2–16 MHz remote control data link frequency range utilized by telemetry buoy 30. Further, if spectral separation is increased by selecting a frequency at the higher end of the frequency spectrum, i.e., above 200 MHz, telemetry data is compromised by severe over-the-horizon effects and reflective effects of passing vehicles due to the shorter wavelengths associated with the higher frequencies. Yet another advantage of telemetering data in the 162–173 MHz frequency range is the availability of off-the-shelf sonobuoy hardware thereby obviating the need for custom components and allowing the present invention to take advantage of well designed/built hardware.

Since telemetry buoy 30 is designed for operation in a relatively fixed relationship with respect to transponder system 20 at remote sea locations, knowledge of the position of telemetry buoy 30 at any given time is important in determining whether telemetry buoy 30 is still moored in position. Accordingly, Global Positioning System (GPS) receiver 370 can be provided for receiving digital GPS satellite information via antenna 371. The satellite information is passed through I/O switch 340 and RF modem 330 to transceiver 320 as dictated by controller 350. In this way, the satellite information is transmitted in the 2-16 MHz frequency range to ship 10 for processing in terms of position of buoy 30.

As mentioned above, local control of buoy electronics 32 (via control data received at transceiver 320) can include activation/deactivation of the power consuming components of electronics 32. For example, activation/deactivation control signals can be applied to transmitter 360 and GPS receiver 370 via control lines 362 and 372, respectively.

In an effort to minimize maintenance in terms of power for buoy electronics 32, a solar power system 380 provides power to the various elements. In particular, solar panels 3802 collect and convert sunlight to electricity. The electricity is passed through charge controller 3804 for charging battery 3806. Charge controller 3804 regulates battery charging to insure that battery 3806 does not exceed a maximum state of charge.

The configuration of solar power system 380 must provide a plurality of voltages $V_1$, $V_2$, ... to meet the specific needs of various elements of buoy electronics 32. By way of example, one such configuration is shown schematically in FIG. 3 for operation with the above-specified transceiver 320 and transmitter 360. In particular, solar panel bank 3802 includes solar panels 3802A, 3802B connected in parallel and 3802C, 3802D connected in parallel. The two parallel combinations are then connected in series with charge controller 3804 which in turn is connected to charge batteries 3806A-3806D of battery bank 3806. Batteries 3806A, 3806B are connected as a parallel combination connected in series with the parallel combination of batteries 3806C, 3806D to provide a $V_1$ (12-volt) and $V_2$ (24-volt) tap. For the illustrative example, each of solar panels 3802A-3802D is a 60 watt solar panel manufactured by Solarex as model MSX-60. Charge controller 3804 is a model CC60D manufactured by Heliotrope General. Each of batteries 3806A-3806D is a gel cell unit model UPS-12-300 manufactured by Johnson Controls. Configured as shown, different voltages $V_1$ and $V_2$ can be tapped from battery bank 3806 as needed depending on the specific needs of buoy electronics 32. Three-terminal, low-dropout voltage regulators (not shown) can be used to provide constant voltages with varying battery conditions for the various components of telemetry buoy 30. Examples of such regulators are the Linear Technology models LT1185 and LT1083.

Status of both buoy 30 and transponder system 20 can also be transmitted back to ship 10 via transceiver 320. For example, as shown in FIG. 2, buoy electronics 32 includes battery voltage sensor 390, temperature sensor 392 and leak detector 394 to provide data to digital controller 350 concerning the battery state of charge, air temperature inside the buoy and moisture content within the buoy. Similarly, transponder system 20 can include sensors (not shown) for detecting conditions (e.g., tilt angle) affecting transponder system 20. Such information would be relayed back to digital controller 350 on signal cable 292. Controller 350 sends received status information via I/O switch 340/RF modem 330 to transceiver 320 for transmission in the 2-16 MHz frequency range.

The advantages of the present invention are numerous. Communication between a remotely located control station and the deep-sea, moored telemetry buoy can be carried on without interference in both directions owing to the wide separation of frequencies used for telemetry uplink and control. The control data frequency range of 2-16 MHz provides high-precision (16-bit) communication needed to control the U.S. Navy's fixed-position PTS. The high-frequency groundwave and skywave propagation in the 2-16 MHz range provides for communication over distances that greatly exceed line-of-sight. The telemetry uplink frequency range of 162-173 MHz provides wideband FM transmission which has a large permissible bandwidth deviation of 75 kHz. The large deviation bandwidth allows for high dynamic range in the FM modulating signal that carries the acoustic tracking information collected by the bottom-mounted transponders. For precision and compatibility with the recently developed PTS, the telemetry buoy operates locally with digital information processing.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A remotely controlled radio telemetry buoy serving as a communication link between an underwater acoustic interrogation/receiving transponder system and a remotely located surface platform, comprising:
   a radio transmitter operably coupled to said transponder system for transmitting data received from said transponder system in a frequency range of 162-173 MHz;
   a radio transceiver operating in a frequency range of 2-16 MHz for exchanging control signals between said surface platform and said buoy;
   a controller operably coupled to said radio transmitter and said radio transceiver for routing said control signals to one of said radio transmitter, said radio transceiver and said transponder system;
   a power supply joined to said radio transmitter, said radio transceiver, said transponder system and said controller for providing power thereto; and
   a housing for maintaining said radio transmitter, said radio transceiver and said power supply, at the surface of the sea in a relatively fixed relationship with respect to said transponder system.

2. A remotely controlled radio telemetry buoy as in claim 1 further comprising an RF modem operably coupled between said radio transceiver and said controller for conditioning said control signals passing therethrough.

3. A remotely controlled radio telemetry buoy as in claim 2 wherein said control signals transferring between said RF modem and said controller are in a digitized serial bit stream format.

4. A remotely controlled radio telemetry buoy as in claim 1 further comprising a Global Positioning System (GPS) receiver operably coupled to said radio transceiver for obtaining GPS position information and for providing said GPS position information to said surface platform via said radio transceiver.

5. A remotely controlled radio telemetry buoy as in claim 1 wherein said power supply comprises a solar power system.

6. A method by which an underwater acoustic interrogation/receiving transponder system communicates with a remotely located, above-water site, comprising the steps of:
   exchanging control signals in a radio frequency range of 2–16 MHz in a bi-directional fashion between said above-water site and a position substantially at the surface of the sea in the vicinity of said transponder system;
   relaying said control signals to said transponder system as a means of controlling said transponder system;
   relaying data collected underwater by said transponder system to said position; and
   transmitting said data collected underwater from said position in a radio frequency range of 162–173 MHz.

7. A method according to claim 6 further comprising the step of digitizing said control signals prior to said step of relaying said control signals to said transponder system.

8. A method according to claim 6 further comprising the steps of:
   collecting Global Positioning System (GPS) signals at said position; and
   transmitting said GPS signals in said radio frequency range of 2–16 MHz.

9. A remotely controlled radio telemetry buoy serving as a communications link between an underwater transponder system and a remotely located surface platform, comprising:
   a sonar transceiver system positioned in acoustic communication with said underwater transponder system;
   a radio transceiver operably coupled to said sonar transceiver system for transmitting data received from said transponder system and for receiving control signals from said surface platform;
   a controller operably coupled to said radio transceiver for routing said control signals to one of said radio transceiver and said sonar transceiver;
   a power supply for powering said radio transceiver, said sonar transceiver and said controller; and
   a housing for maintaining said radio transceiver, said sonar transceiver, said controller, and said power supply, at the surface of the sea in a relatively fixed relationship with respect to said transponder system.

10. A remotely controlled radio telemetry buoy as in claim 9 wherein said radio transceiver comprises:
    a data transmitter coupled to said sonar transceiver for transmitting data received from said transponder system; and
    a control transceiver coupled to said controller for exchanging control signals with said surface platform.

11. A remotely controlled radio telemetry buoy as in claim 10 wherein said data transmitter transmits data as electromagnetic energy in a frequency range of 162–173 MHz, and said control transceiver exchanges control signals as electromagnetic energy in a frequency range of 2–16 MHz.

12. A remotely controlled radio telemetry buoy as in claim 10 further comprising an RF modem operably coupled between said control transceiver and said controller for conditioning said control signals passing therethrough.

13. A remotely controlled radio telemetry buoy as in claim 12 wherein said control signals transferring between said RF modem and said controller are in a digitized serial bit stream format.

14. A remotely controlled radio telemetry buoy as in claim 10 further comprising a Global Positioning System (GPS) receiver operably coupled to said control transceiver for obtaining GPS position information and for providing said GPS position information to said surface platform via said control transceiver.

15. A remotely controlled radio telemetry buoy as in claim 9 further comprising:
    a temperature sensor located in said buoy and joined to said controller to provide temperature data for transmission to said remote platform;
    a moisture sensor located in said buoy and joined to said controller to provide buoy condition data for transmission to said remote platform; and
    a voltage sensor located in said buoy and joined to said controller and to said power supply to provide power supply data for transmission to said remote platform.

16. A remotely controlled radio telemetry buoy as in claim 15 wherein said power supply comprises a solar power system.

* * * * *